United States Patent
Reichardt et al.

(10) Patent No.: US 6,336,588 B1
(45) Date of Patent: *Jan. 8, 2002

(54) CHIP CARD READER WITH A CARD PRESENCE SWITCH MOUNTED IN THE COVER

(75) Inventors: Manfred Reichardt, Weinsberg; Bernd Schuder, Schwaigern, both of (DE)

(73) Assignee: Amphenol-Tuchel Electronics GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,547

(22) Filed: Feb. 18, 1998

(30) Foreign Application Priority Data

Feb. 28, 1997 (DD) .......................... 197 08 221

(51) Int. Cl.[7] ............................... G06K 13/00
(52) U.S. Cl. ................ 235/475; 235/439; 235/441; 439/188
(58) Field of Search ................ 235/475, 439, 235/441, 492, 495, 486, 451; 902/26; 361/752, 737, 753, 683, 832; 439/188

(56) References Cited

U.S. PATENT DOCUMENTS

| | | | | | |
|---|---|---|---|---|---|
| 4,900,273 A | * | 2/1990 | Pernet | .......................... | 439/630 |
| 5,231,274 A | * | 7/1993 | Reynier et al. | ............. | 235/441 |
| 5,334,827 A | * | 8/1994 | Bleier et al. | ................. | 235/492 |
| 5,370,544 A | * | 12/1994 | Reichardt et al. | ........... | 439/188 |
| 5,673,180 A | * | 9/1997 | Pernet | .......................... | 361/756 |
| 5,686,714 A | * | 11/1997 | Abe et al. | ............... | 235/441 X |
| 5,703,346 A | * | 12/1997 | Bricaud et al. | ............. | 235/441 |
| 5,714,742 A | * | 2/1998 | Ieda | ........................... | 235/441 |
| 5,739,516 A | * | 4/1998 | Bricaud | ..................... | 235/441 |

FOREIGN PATENT DOCUMENTS

| | | |
|---|---|---|
| DE | 42 12 150 A1 | 2/1992 |
| EP | 0 316 699 | 5/1989 |
| JP | 8-30739 | * 2/1996 |

* cited by examiner

Primary Examiner—Michael G. Lee
Assistant Examiner—Jared J. Fureman
(74) Attorney, Agent, or Firm—Blank Rome Comisky & McCauley, LLP

(57) ABSTRACT

The invention relates to a chip card reader with a frame and/or contact support supporting reading contacts with a cover fixable on the contact support and with a limiting switch, wherein the limiting switch is located in the cover.

8 Claims, 5 Drawing Sheets

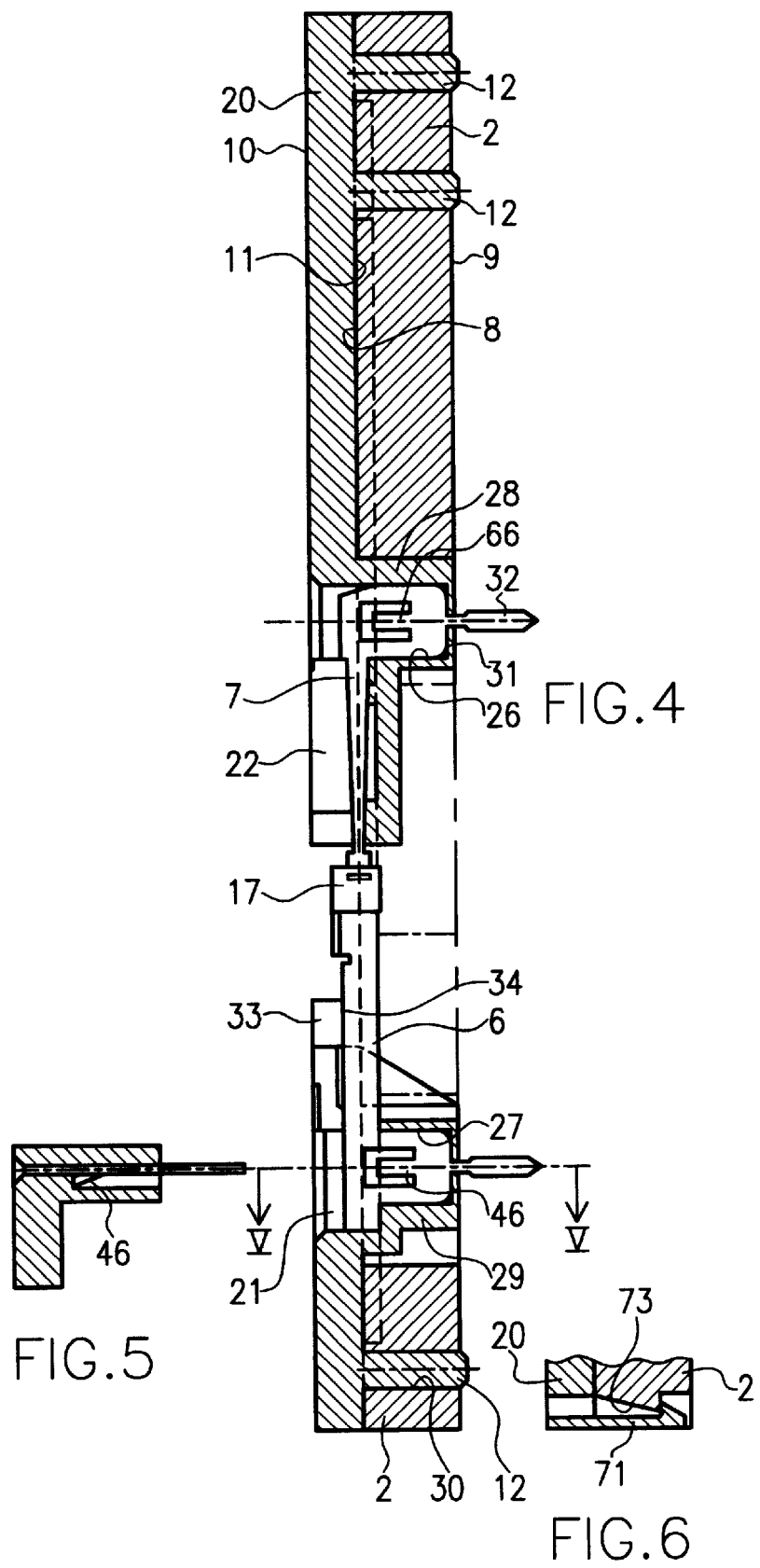

CHIP CARD READER WITH A CARD PRESENCE SWITCH MOUNTED IN THE COVER

FIELD OF THE INVENTION

The invention relates to a chip or smart card reading device, i.e. a contacting apparatus with reading contacts that are to be brought into contacting engagement with contact surfaces on a chip or smart card.

BACKGROUND OF THE INVENTION

EP 0 316 699 shows the frame of a chip card reader in which a limiting switch (end position switch) comprising switch contacts is fastened on the frame carrying the reading contacts. From DE 42 12 150 A1, a chip card reader is further known with a limiting switch in which both the reading contacts and the switch contacts of a limiting switch are also located in a frame.

The mounting of the switch contacts in the frame carrying the reading contacts has disadvantages, in particular also during its assembly. When the switch contacts are fastened in the frame, for example by snapping them in, limitations result on account of the structural height of the frame and through the thickness of the card, in particular in that only short guide means result for the insertion of the switch contacts, which does not promote a precise mounting of the switch contacts. Due to the switch contacts present in the frame, difficulties also arise during the assembly of reading contacts into the frame, said reading contacts being adapted to be inserted into the frame from the side or injection molded. This leads to higher costs in the manufacturing of the chip card reader.

SUMMARY OF THE INVENTION

It is an object of the present invention to provide a chip card reader with a contact support and/or frame supporting reading contacts and with a cover covering the contact support and/or frame is provided, wherein the limiting switch is located in the cover. In this manner, the frame and cover can be assembled in parallel, which shortens and simplifies the assembly. This yields lower costs. Furthermore, an assembly of the reading contacts from the side into the frame is easy to implement.

It is an object of the invention to avoid the disadvantages of the prior art. It is a particular object of the invention to provide a cost-efficient chip card reader that allows a simpler assembly of the reader as a whole.

Although the invention is preferably applied to a chip card reader of the type with a frame and a cover, it is also conceivable that the measures in accordance with the invention could be provided in a chip card reader of a type wherein a lowerable sliding carriage supporting the reading contacts is provided.

Further advantages, objects and details of the invention are disclosed in the description of the preferred embodiments and the drawings.

BRIEF DESCRIPTION OF THE DRAWINGS

FIG. 4 a cross-section essentially along line IV—IV of FIG. 2;

FIG. 5 a cross-section along line V—V in FIG. 4;

FIG. 6 a cross-section along line VI—VI in FIGS. 1 and 2 for illustrating the snap-locking action of the cover with the frame, wherein the cover is to be considered lying on the frame;

DETAILED DESCRIPTION OF THE INVENTION

In the following, a preferred embodiment of a chip or smart card reader (chip or smart card contacting device) 1 is described based on FIGS. 1 to 7 as well as 9 and 10. The chip card reader 1 consists essentially of a frame or contact support 2 shown in FIG. 1 and a cover 20 shown in FIG. 2. The chip card 3 is shown by dashed lines in FIGS. 1 and 2, and an arrow B indicates in which direction the chip card 3 is inserted into the chip card reader 1.

Figure 1:
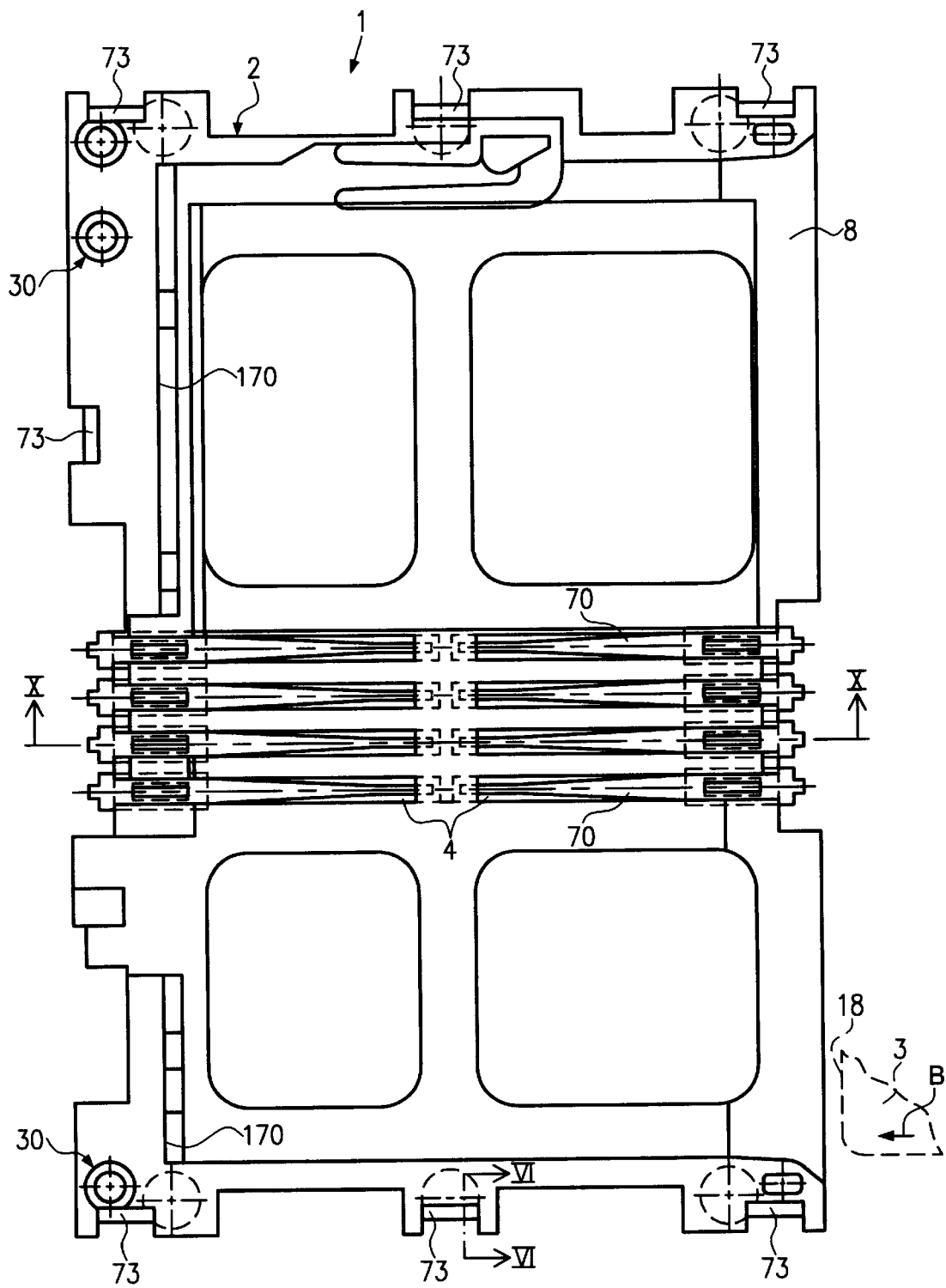
FIG. 1 a plan view of a frame supporting reading contacts.
Figure 9:
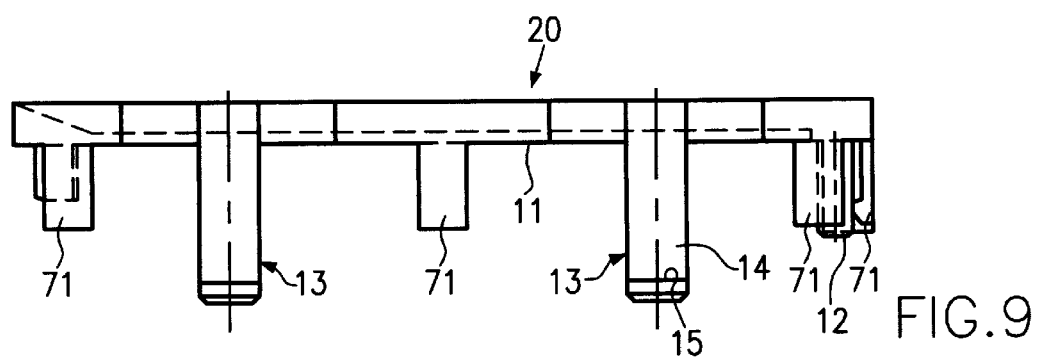
FIG. 9 a side view of the cover from the direction of arrow A in FIG. 2.
Figure 10:
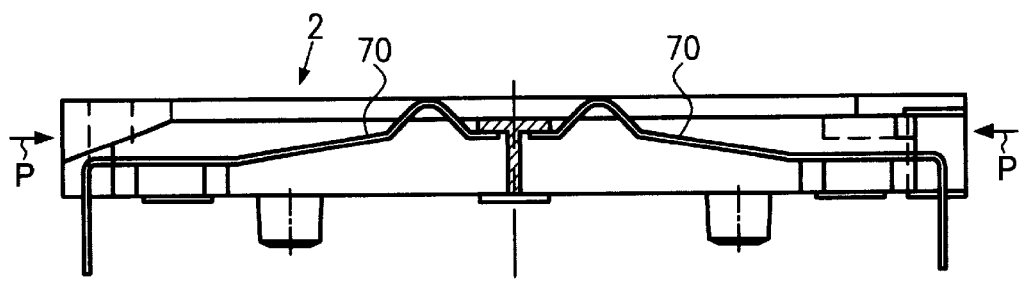
FIG. 10 a cross-section along line X—X in FIG. 1.

One can see in FIG. 1 that the frame 2 comprises several openings 30 (not all openings are illustrated) that serve the purpose of accepting guide elements (pegs 12 in FIGS. 2, 4 and 9) of the cover 20, still to be described. Furthermore, cut-outs 4 are provided in frame 2, in which the reading contacts (reading contact elements) 70 (cf. FIG. 10) are inserted. The reading contacts 70 serve, in a known manner, for contacting the contact surfaces of the chip card. Further details are shown in FIG. 10.

The frame 2 further comprises an upper side 8 as well as an underside designated as 9 in FIG. 4.

Figure 2:
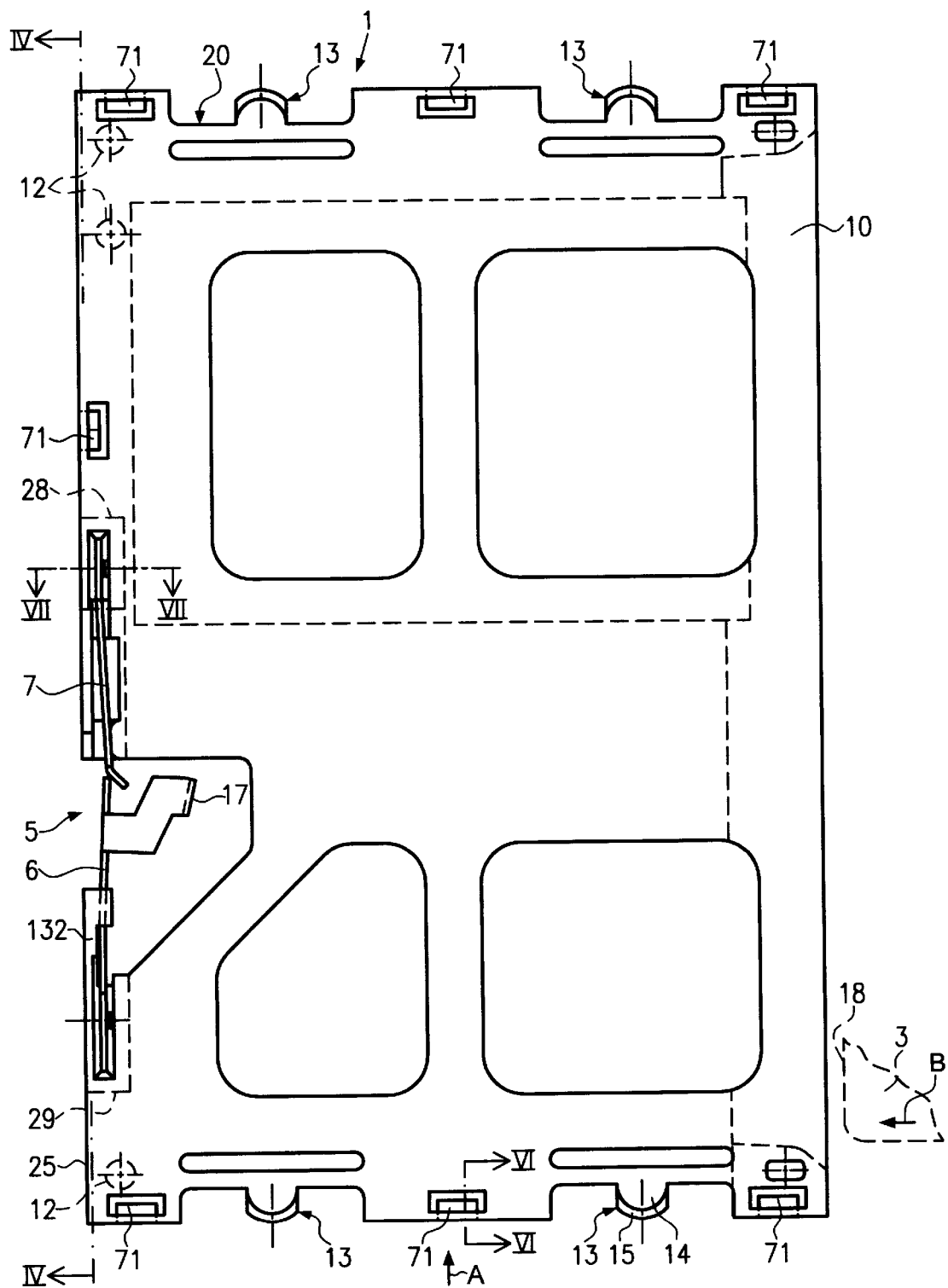
FIG. 2 a plan view of a cover that can be set upon the frame of FIG. 1, as shown in the cross section of FIG. 4, and can be connected with same, for instance via a snapping action, wherein a limiting switch is located in the cover.

FIG. 2 shows the cover 20 that comprises an upper side 10 and a lower side 11 that can be seen in FIG. 4. For manufacturing the complete chip card reader 1, the cover 20 is set upon the frame 2 and connected with same, for instance through a snapping action, as illustrated in FIG. 4. This is described further below with reference to FIGS. 6 and 8. The underside of the cover 20 then lies on the corresponding seat surfaces of the upper side 8 of the frame 2, wherein a slit is provided between the upper side 8 and lower side 11 that allows the insertion of the card 3.

In accordance with the invention, a limiting switch 5 known per se is located in the cover 20 and not in the frame 2.

Furthermore, snap and guide elements 13 (FIG. 2) are formed on the cover 20 that also project from the underside 11. The snap and guide elements 13 comprise peg-like extensions 14 (FIG. 9) on whose lower ends snap projections 15 are formed that then cooperate with corresponding snap surfaces, defined for instance by a circuit board (not shown), when the underside 9 of the frame 2 lies on the upper side of such a circuit board, in order to fix the chip card reader 1 thereto.

Figure 3:
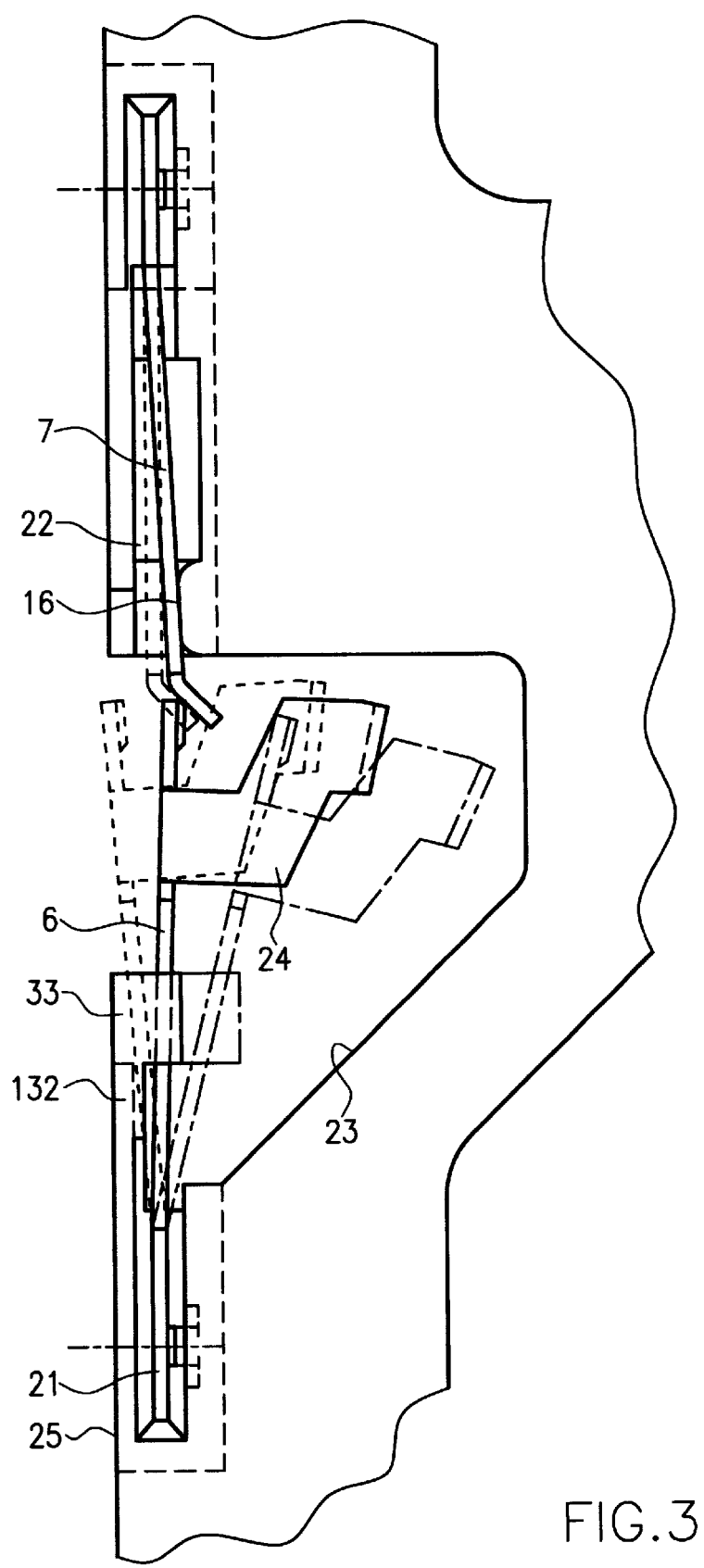
FIG. 3 a detail of the plan view of FIG. 2 in the region of the limiting switch.

The limiting switch 5 located in the cover 20 in accordance with the invention will now be explained, in particular with reference to FIGS. 3 to 5.

The limiting switch 5 comprises two switch contacts (switch contact elements) 6 and 7. The switch contact 6 can be moved from the position shown in FIG. 3 by solid lines by the chip card 3 during its insertion into the chip card reader 1 to the position shown by dotted lines, wherein the switch contact 6 thus lifts from the switch contact 7 and the switch contact 7 thus lifts up slightly from a support surface 16 formed by the cover 20. In the position of the switch contact 6 illustrated in FIG. 3 by solid lines, said switch contact 6 is preferably biased and presses the switch contact 7 against the seat surface 16 with its force.

The limiting switch 5 is provided, as one can recognize in FIG. 2, in the rear portion of the cover 20 relative to the direction of card insertion such that a cam surface 17 of the switch contact 6 projects into the region towards which the chip card 3 moves to its final position against the support surface 170 (cf. FIG. 1). In the last part of the insertion motion of card 3, the card then touches the cam surface 17 with its forward edge 18 to move the switch contact 6 into the open position illustrated by dotted lines in FIG. 3. The limiting switch 5 is also a so-called "normally closed circuit," i.e. a switch that opens during actuation via the card 3. It is also conceivable to form the limiting switch 5 as a "normally open circuit," i.e. a switch wherein the switch 5 is closed during the motion of the card 3 into its final position.

As with the reading contacts (70) of the frame 2, the switch contacts 6 and 7 could also be injection molded into the cover when the frame and/or cover is manufactured by injection molding of a plastic. As can be seen in the illustrated embodiment, contact chambers 21, 22 adapted to receive switch contacts 6 and 7, respectively, can be preferably manufactured in the plastic of the cover 20 during injection molding (FIG. 4). These contact chambers 21, 22 are located adjacent to a cut-out 23 that forms a cut-out for the actuation arm 24 of the switch contact 6 carrying the cam surface 17. The free end of the switch contact 6 and the switch contact 7 also project into this cut-out 23.

The contact chambers 21 and 22 extend essentially parallel to the rear edge 25 of the cover 20. The chamber 22 comprises an extension 26 extending perpendicular thereto (cf. FIG. 4) that is formed in a block-like projection 28 of the cover 20. The terminal 32 of the switch contact 7 runs through the bottom 31 of the extension 26. A snap tongue 66 of the switch contact 7 can come into engagement with the wall of chamber 26 in order to hold the switch contact 7 in the position shown in FIG. 4, cf. also FIG. 7.

Similar to the switch contact 7, the switch contact 6 also comprises a contact portion extending perpendicular to the longitudinal axis of the switch contact 6, said contact portion sitting on an extension 27 of chamber 21 and being snapped together with the chamber wall via a snap tongue 46. The extension 27 is formed in a block-like projection 29 that extends from the underside 11 of the cover 20 as does the projection 28.

The contact chamber 21 for the switch contact 6 ends along the cut-out 23, wherein the one wall of the chamber 21 is extended and forms an arm 132 (FIG. 3) that runs parallel to the switch contact 6. On the end of the arm 132, the arm forms a broadening 33 that projects into the cut-out 23. The underside 34 of the broadening 33 to be seen in FIG. 4 forms a support surface for the corresponding edge of the switch contact 6, even during its motion from the resting position shown in FIG. 3 by solid lines into the open or actuating position shown in FIG. 3 by dotted lines.

The preferred means for fixing the cover 20 onto the frame 2 will now be again shortly discussed. The aforementioned guide pegs 12 (FIG. 4) located on the cover 20 and projecting from the underside 11 thereof are preferably injection molded of plastic together with the cover 20.

These pegs 12 are insertable into corresponding openings 30 in the frame 2, as shown in FIG. 4. This allows a precise positioning of the limiting switch 5 in the operation-ready chip card reader 1. The fixing of the cover 20 onto the frame 12 is preferably carried out via a snapping action.

Figures 7, 8:
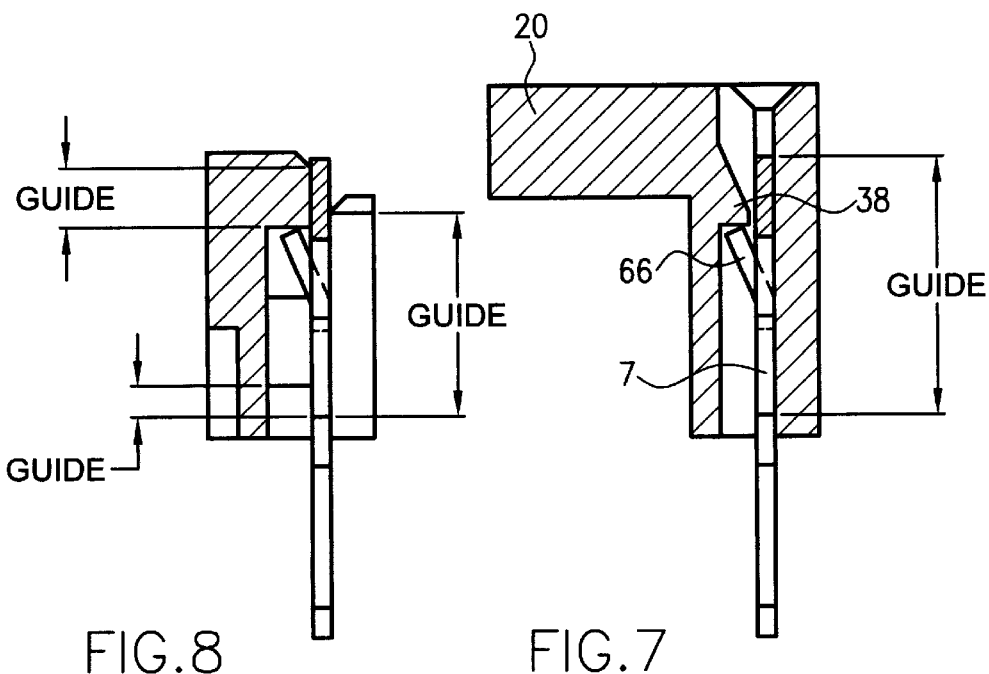
FIG. 7 a cross-section along line VII—VII in FIG. 2 showing the mounting of a suited contact in the cover.
FIG. 8 a cross-section through the frame supporting the reading contacts in a chip card reader in accordance with the prior art, wherein the limiting switch, of which one of the switch contacts is illustrated here, is also located in the frame and held.

FIG. 7 shows a detail of the snapping of the switch contact 7 with its snap tongue 66 behind a projection 38 of the cover 20. For comparison, FIG. 8 shows the less preferable snapping action of a switch contact of the prior art, which provides for less guidance of the contacts.

FIG. 6 shows the snapping of the cover 20 to the frame 2 in detail. For this purpose, several snap hooks 71 are provided on the cover 20. The snap hooks 71 can come into engagement with a snap surface (not shown in FIG. 6) on the frame 2 and are indeed guided via bevelled surface 73 (cf. FIG. 1 and 6).

FIG. 10 shows the reading contact 70 snapped into frame 2. In the frame design shown here, the reading contacts 70 in FIG. 1 are not inserted into the frame from above, but rather from the side in the direction of the arrow P in FIG. 10. This sideward insertion (or also injection molding) of the reading contact 70 can be carried out easily and inexpensively thanks to the limiting switch (5) lying in the cover 20.

What is claimed:

1. A chip card reader comprising:
   a plurality of chip card reading contacts arranged to engage terminals on a chip card in order to read information stored on said chip card;
   a frame to which said chip card reading contacts are mounted;
   a cover arranged to cover said frame and form a card receiving slot with said frame, said cover being a separate member from said frame that is fixedly mounted to said frame and having an underside to which the frame is affixed and an upper side opposite said underside; and
   a limiting switch comprising two switch contacts arranged to be engaged by a chip card inserted into said frame and thereby detect when said chip card has reached a predetermined position within said frame and wherein said switch contacts are inserted into the cover from said upper side.

2. A chip card reader, comprising:
   a plurality of chip card reading contacts arranged to engage terminals on a chip card in order to read information stored on said chip card;
   a frame to which said chip card reading contacts are mounted;
   a cover arranged to cover said frame and form a card receiving slot with said frame, said cover being a separate member from said frame that is fixedly mounted to said frame; and
   a limiting switch arranged to be engaged by a chip card inserted into said frame and thereby detect when said chip card has reached a predetermined position within said frame,
   wherein the limiting switch is mounted to the cover and not to the frame by being inserted into guides provided in the cover and comprises a first switch contact and a second switch contact and at least one of said first and second switch contacts moves in the same direction as the chip card moves within the card receiving slot;
   wherein the switch contacts are inserted into chambers that are provided adjacent to a rear edge of the cover and run parallel to the rear edge;

wherein the contact chambers are separated from one another by a cut-out formed in the cover.

3. A chip card reader as claimed in claim 2, wherein at least one switch contact of appropriate size projects into the cut-out.

4. A chip card reader, comprising:

a plurality of chip card reading contacts arranged to engage terminals on a chip card in order to read information stored on said chip card;

a frame to which said chip card reading contacts are mounted;

a cover arranged to cover said frame and form a card receiving slot with said frame, said cover being a separate member from said frame that is fixedly mounted to said frame; and a limiting switch arranged to be engaged by a chip card inserted into said frame and thereby detect when said chip card has reached a predetermined position within said frame, wherein the limiting switch is mounted to the cover and not to the frame by being inserted into guides provided in the cover and comprises a first switch contact and a second switch contact and at least one of said first and second switch contacts moves in the same direction as the chip card moves within the card receiving slot;

wherein the switch contacts are inserted into chambers that are provided adjacent to a rear edge of the cover and run parallel to the rear edge;

wherein the contact chambers comprise extensions formed in projections that project from an underside of the cover.

5. A chip card reader comprising:

a plurality of chip card reading contacts arranged to engage terminals on a chip card in order to read information stored on said chip card;

a frame to which said chip card reading contacts are mounted;

a cover arranged to cover said frame and form a card receiving slot with said frame, said cover being a separate member from said frame that is fixedly mounted to said frame;

a limiting switch comprising two switch contacts arranged to be engaged by a chip card inserted into said frame and thereby detect when said chip card has reached a predetermined position within said frame; and wherein the switch contacts are inserted into chambers that are provided adjacent to a rear edge of the cover and run parallel to the rear edge and the contact chambers guide the switch contacts during insertion of the switch contacts into the cover.

6. A chip card reader comprising:

a plurality of chip card reading contacts arranged to engage terminals on a chip card in order to read information stored on said chip card;

a frame to which said chip card reading contacts are mounted;

a cover arranged to cover said frame and form a card receiving slot with said frame, said cover being a separate member from said frame that is fixedly mounted to said frame;

a limiting switch comprising two switch contacts arranged to be engaged by a chip card inserted into said frame and thereby detect when said chip card has reached a predetermined position within said frame; and wherein each of the switch contacts, in their inserted condition, are snapped together with projections of the cover.

7. A chip card reader, comprising:

a plurality of chip card reading contacts arranged to engage terminals on a chip card in order to read information stored on said chip card;

a frame to which said chip card reading contacts are mounted;

a cover arranged to cover said frame and form a card receiving slot with said frame, said cover being a separate member from said frame that is fixedly mounted to said frame; and a limiting switch arranged to be engaged by a chip card inserted into said frame and thereby detect when said chip card has reached a predetermined position within said frame, wherein the limiting switch is mounted to the cover and not to the frame by being inserted into guides provided in the cover and comprises a first switch contact and a second switch contact and at least one of said first and second switch contacts moves in the same direction as the chip card moves within the card receiving slot;

wherein the switch contacts are insertable into chambers provided adjacent a rear edge of the cover and running parallel to the rear edge, and wherein an arm having an enlarged free end extends from one of the contact chambers to guide one of the switch contacts.

8. A chip reader comprising:

a plurality of chip card reading contacts arranged to engage terminals on a chip card in order to read information stored on said chip card;

a frame to which said chip card reading contacts are mounted;

a cover arranged to cover said frame and form a card receiving slot with said frame, said cover being a separate member from said frame that is fixedly mounted to said frame;

a limiting switch arranged to be engaged by a chip card inserted into said frame and thereby detect when said chip card has reached a predetermined position within said frame and being mounted to the cover and not to the frame by being inserted into guides provided in the cover and comprising a first switch contact and a second switch contact and at least one of said first and second switch contacts moving in the same direction as the chip card moves within the card receiving slot.

* * * * *